United States Patent
Li et al.

(10) Patent No.: US 11,247,703 B2
(45) Date of Patent: Feb. 15, 2022

(54) BOGIE ASSEMBLY AND STRADDLE-TYPE MONORAIL VEHICLE HAVING SAME

(71) Applicant: BYD COMPANY LIMITED, Guangdong (CN)

(72) Inventors: Daolin Li, Shenzhen (CN); Zhicheng Tan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 260 days.

(21) Appl. No.: 16/334,918

(22) PCT Filed: Feb. 28, 2017

(86) PCT No.: PCT/CN2017/075171
§ 371 (c)(1),
(2) Date: Mar. 20, 2019

(87) PCT Pub. No.: WO2018/054003
PCT Pub. Date: Mar. 29, 2018

(65) Prior Publication Data
US 2019/0210620 A1  Jul. 11, 2019

(30) Foreign Application Priority Data
Sep. 21, 2016  (CN) .......................... 201610839788.4

(51) Int. Cl.
*B61B 13/04* (2006.01)
*B61C 9/50* (2006.01)
*B61F 5/22* (2006.01)
*B61F 5/10* (2006.01)
*B61C 3/00* (2006.01)

(52) U.S. Cl.
CPC ................ *B61B 13/04* (2013.01); *B61C 9/50* (2013.01); *B61F 5/10* (2013.01); *B61F 5/22* (2013.01); *B61C 3/00* (2013.01)

(58) Field of Classification Search
CPC ... B61B 13/04; B61C 9/50; B61C 3/00; B61F 5/10; B61F 5/22; B61F 3/00; B61F 3/02;
(Continued)

(56) References Cited

U.S. PATENT DOCUMENTS 4,170,945 A * 10/1979 Kayserling ............... B61C 9/44
                                                          105/131
8,596,202 B2 * 12/2013 Rodet ....................... B61F 3/04
                                                          105/133
(Continued)

FOREIGN PATENT DOCUMENTS

CN        201296254 Y      8/2009
CN        203402195 U      1/2014
(Continued)

OTHER PUBLICATIONS

PCT International Search Report and the Written Opinion dated Jun. 22, 2017, issued in related International Application No. PCT/CN2017/075171 (9 pages).
(Continued)

*Primary Examiner* — Robert J McGarry, Jr.

(57) ABSTRACT

The present disclosure provides a bogie assembly and a straddle-type monorail vehicle with the same. The bogie assembly comprises: a bogie frame; an electric assembly which is mounted on the bogie frame and comprises a traction motor, a gear reducer and a planetary wheel-side reducer, wherein the traction motor is connected with an input shaft of the gear reducer, and an output shaft of the gear reducer is connected with an input end of the planetary wheel-side reducer; and a running wheel which is mounted on the bogie frame, wherein an output end of the planetary wheel-side reducer is connected with a hub of the running wheel.

19 Claims, 12 Drawing Sheets

(58) Field of Classification Search
CPC ..... B61F 3/04; B61F 3/08; B61F 3/16; B61H 1/00; B61H 3/00; B61H 9/00; B61H 9/006; B61H 13/00
See application file for complete search history.

(56) References Cited

U.S. PATENT DOCUMENTS

2004/0123767 A1* 7/2004 Nishimura ................ B61F 5/52
 105/157.1
2009/0266268 A1 10/2009 Timan et al.

FOREIGN PATENT DOCUMENTS

| CN | 103950455 A | 7/2014 |
| CN | 104691561 A | 6/2015 |
| CN | 105905120 A | 8/2016 |
| CN | 106809230 B | 2/2018 |
| JP | 04-244706 A | 9/1992 |
| JP | 09-123907 A | 6/2009 |

OTHER PUBLICATIONS

First Search dated Jul. 10, 2017, issued in related Chinese Application No. 201610839788.4 (1 page).
First Office Action dated Jul. 18, 2017, issued in related Chinese Application No. 201610839788.4 (11 pages), with English machine translation.
Second Office Action dated Sep. 15, 2017, issued in related Chinese Application No. 201610839788.4 (10 pages), with English machine translation.

* cited by examiner

BOGIE ASSEMBLY AND STRADDLE-TYPE MONORAIL VEHICLE HAVING SAME

CROSS-REFERENCE TO RELATED APPLICATIONS

This application is a national phase application of International Application No. PCT/CN2017/075171, filed on Feb. 28, 2017, which is based on and claims priority to and benefits of Chinese Patent Application No. 201610839788.4, filed with the State Intellectual Property Office (SIPO) of the People's Republic China on Sep. 21, 2016. The entire contents of the above-identified applications are incorporated herein by reference.

FIELD

The present disclosure belongs to the field of vehicle manufacturing technology, and in particular relates to a bogie assembly and a straddle-type monorail vehicle with the bogie assembly.

BACKGROUND

The laying cost of a straddle-type monorail transportation system is much lower than that of a subway transportation system, and its application scope is wider. An electric assembly is an important part of a straddle-type monorail vehicle. The reduction ratio of the electric assembly in the related technology is small, such that the electric assembly can only use a motor with low rotating speed, and the energy utilization efficiency of the motor with low rotating speed is relatively low. Moreover, the electric assembly in the related technology occupies a large space and cannot realize a low floor structure. Since the mass of the whole vehicle is larger and the energy consumption is higher, it is not conducive to energy conservation and environmental protection, and needs improvement.

SUMMARY

The present disclosure solves one of technical problems in related technologies at least to a certain extent. For this reason, one purpose of the present disclosure is to provide a bogie assembly with a compact structure and high energy efficiency.

Another purpose of the present disclosure is to provide a straddle-type monorail vehicle with the bogie assembly.

The bogie assembly according to the embodiment in the first aspect of the present disclosure comprises: a bogie frame; an electric assembly, the electric assembly being mounted on the bogie frame, the electric assembly comprising a traction motor, a gear reducer and a planetary wheel-side reducer, the traction motor being connected with an input shaft of the gear reducer, and an output shaft of the gear reducer being connected with an input end of the planetary wheel-side reducer; and a running wheel, the running wheel being mounted on the bogie frame and an output end of the planetary wheel-side reducer being connected with a hub of the running wheel.

Since the bogie assembly according to the embodiment in the first aspect of the present disclosure adopts a driving solution of integrally mounting the traction motor, the gear reducer, the planetary wheel-side reducer, the hub and the like, the overall structure is simple, the occupied space is small, a low floor structure can be realized, the weight is light, the energy efficiency is high and it is conducive to energy conservation and environmental protection.

In addition, the bogie assembly according to the embodiment of the present disclosure may further have the following additional technical features.

In some embodiments of the present disclosure, the electric assembly further comprises: a brake, the brake being disposed between the traction motor and the running wheel.

In some embodiments of the present disclosure, the brake is mounted between the gear reducer and the hub of the running wheel.

In some embodiments of the present disclosure, the brake comprises: a brake disc, the brake disc being connected with the hub of the running wheel; brake calipers, the brake calipers being connected with a box body of the gear reducer; and a brake driving unit, the brake driving unit being used for driving the brake calipers.

In some embodiments of the present disclosure, the electric assembly is disposed on the inner side of the bogie frame.

In some embodiments of the present disclosure, the traction motor is transversely disposed.

In some embodiments of the present disclosure, the traction motor is connected with the box body of the gear reducer and the box body of the gear reducer is connected with the bogie frame.

In some embodiments of the present disclosure, the bogie frame further comprises a traction mechanism comprising: a traction frame, the traction frame straddling the bogie frame along a front-rear direction; and a traction pin assembly, the traction pin assembly being connected with the traction frame and adapted to be connected with a vehicle body.

In some embodiments of the present disclosure, the traction pin assembly comprises: a pin shaft, the pin shaft being connected with the top wall of the traction frame, the upper end of the pin shaft being provided with a flange and the flange being adapted to be connected with the vehicle body.

In some embodiments of the present disclosure, the top wall of the traction frame is provided with a mounting hole, the pin shaft has a threaded segment, the pin shaft penetrates through the mounting hole and the threaded segment is fixed through a nut.

In some embodiments of the present disclosure, the traction pin assembly further comprises: a bushing, the bushing being sleeved over the pin shaft; an upper shock absorbing pad, the upper shock absorbing pad being clamped between the flange and the upper surface of the top wall of the traction frame; and a lower shock absorbing pad, the lower shock absorbing pad being clamped between the nut and the lower surface of the top wall of the traction frame.

In some embodiments of the present disclosure, the bushing comprises an outer steel bushing, an inner steel bushing and a buffer bushing between the outer steel bushing and the inner steel bushing.

In some embodiments of the present disclosure, the traction pin assembly comprises: a pin shaft, the pin shaft being connected with the top wall of the traction frame; and a vehicle body connecting member, the vehicle body connecting member being arranged such that the rigidity in a front-rear direction is greater than the rigidity in the left-right direction, and comprising: a pin bushing mounting seat, the pin bushing mounting seat being adapted to be connected with the vehicle body; and a pin bushing, the pin bushing being connected with the pin bushing mounting seat and sleeved over the pin shaft.

In some embodiments of the present disclosure, the pin bushing mounting seat comprises: a fixing cylinder, the fixing cylinder being sleeved over the pin bushing and a buffer member being arranged between the fixing cylinder and the pin bushing; and a mounting plate, the mounting plate being connected with the fixing cylinder and adapted to be connected with the vehicle body.

In some embodiments of the present disclosure, the fixing cylinder and the buffer member respectively have an elliptical horizontal section, moreover the long axis of the elliptical horizontal section is oriented along the front-rear direction, and the short axis of the elliptical horizontal section is oriented along the left-right direction.

In some embodiments of the present disclosure, a gap is provided in the buffer member and the gap is located on the left side or the right side of the pin shaft.

In some embodiments of the present disclosure, the number of the gaps is two and the two gaps are respectively located on the left side and the right side of the pin shaft.

In some embodiments of the present disclosure, the horizontal section of the gap is arch-shaped and comprises a first segment, a second segment and a third segment sequentially connected along the front-rear direction, the second segment is rectangular, the long side of the second segment faces the pin bushing, the first segment is an arc-shaped segment extending from the short side of the second segment to the edge of the buffer member, and the first segment and the third segment are symmetrically arranged.

In some embodiments of the present disclosure, the buffer member comprises a plurality of sub-buffer members.

In some embodiments of the present disclosure, the buffer member is partitioned into four sub-buffer members by two parallel partitioning planes and the pin bushing, the normal of each partitioning plane is oriented along the front-rear direction, and each partitioning plane is intersected with the pin bushing.

In some embodiments of the present disclosure, a gap is provided in the buffer member, the gap divides the sub-buffer member between the two partitioning planes into two portions, the portion, close to the pin bushing, in the two portions is fixed with the pin bushing, and the portion, close to the fixing cylinder, in the two portions is fixed with the fixing cylinder.

In some embodiments of the present disclosure, the traction frame is arch-shaped and covers a position above the running wheel.

In some embodiments of the present disclosure, the traction frame comprises: a top wall; and two sidewalls, the upper ends of the two sidewalls being respectively connected with the front end and the rear end of the top wall, the lower end of each sidewall being provided with a plurality of fixing seats used for being connected with the bogie frame such that the traction frame is adapted to straddle the bogie frame along the front-rear direction, the plurality of fixing seats at the lower end of the same sidewall comprising a first fixing seat and a second fixing seat, and the bottom surface of the first fixing seat and the bottom surface of the second fixing seat being located on different horizontal planes.

In some embodiments of the present disclosure, the position between the first fixing seat and the corresponding second fixing seat is hollowed out to form a lightening hole.

In some embodiments of the present disclosure, the width of the sidewalls is gradually increased from top to bottom.

In some embodiments of the present disclosure, the top wall is flat and the sidewalls are arc-shaped.

In some embodiments of the present disclosure, the sidewall comprises a plurality of sequentially connected arc-shaped segments.

In some embodiments of the present disclosure, the bogie assembly further comprises a suspension system comprising: a suspension mounting seat, the suspension mounting seat being adapted to be connected with the vehicle body; a transverse shock absorber, the transverse shock absorber being connected between the suspension mounting seat and the bogie frame; a longitudinal shock absorber, the longitudinal shock absorber being connected between the suspension mounting seat and the bogie frame; and an elastic member, the elastic member being connected between the suspension mounting seat and the bogie frame.

The straddle-type monorail vehicle according to the embodiment of the second aspect of the present disclosure comprises the bogie assembly according to the embodiment of the first aspect of the present disclosure.

The straddle-type monorail vehicle according to the embodiment of the present disclosure has the same advantages as the bogie assembly according to the embodiment of the present disclosure relative to the prior art, which will not be repetitively described here.

BRIEF DESCRIPTION OF THE DRAWINGS

The foregoing and/or additional aspects and advantages of the present disclosure become obvious and easily understood in descriptions of the embodiments with reference to the following accompanying drawings.

Figure 1:
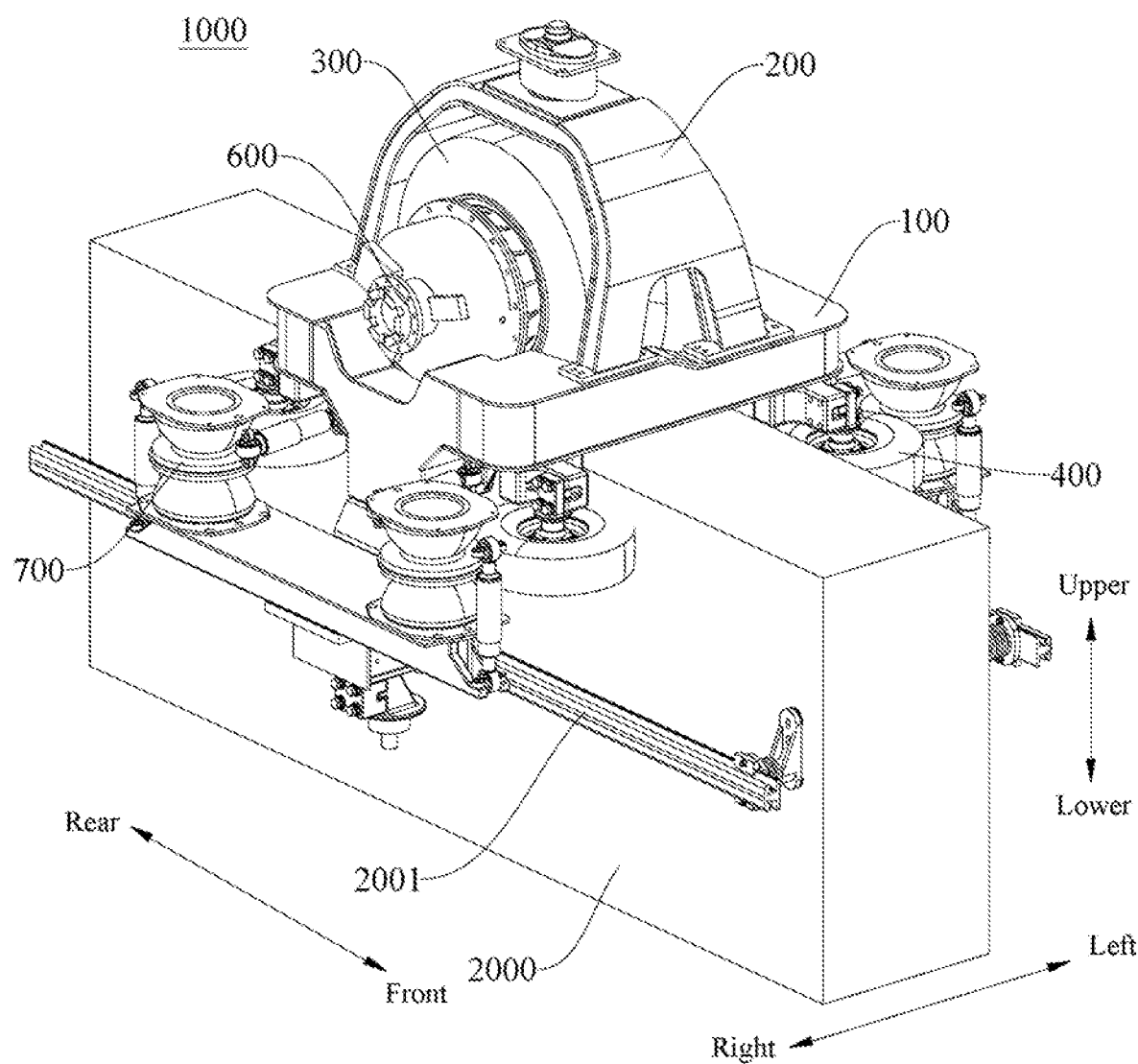
FIG. 1 is a structural schematic diagram of a bogie assembly and a rail girder according to one embodiment of the present disclosure.

NUMERALS bogie assembly 1000, bogie frame 100, frame body 110, suspension supporting seat 120, traction mechanism 200, traction frame 210, top wall 211, sidewall 212, reinforcing rib 212a, first fixing seat 213, first connecting arm 213a, first mounting plate 213b, second fixing seat 214, second connecting arm 214a, second mounting plate 214b, lightening hole 215, traction pin assembly 220, pin shaft 221, flange 221a, threaded segment 221b, pin bushing 222, fixing cylinder 223, mounting plate 224, buffer member 225, sub-buffer member 225a, 225b, 225c, 225d, partitioning plane 225e, gap 226, first segment 226a, second segment 226b, third segment 226c, bushing 227, upper shock absorbing pad 228a, lower shock absorbing pad 228b, nut 229a, gasket 229b, running wheel 300, guide wheel 400, stabilizing wheel 500, electric assembly 600, traction motor 610, gear reducer 620, planetary wheel-side reducer 630, brake 640, brake disc 641, brake calipers 642, brake driving unit 643, suspension system 700, suspension mounting seat 710, transverse shock absorber 720, longitudinal shock absorber 730, elastic member 740, air spring 761, supporting plate 762, rail girder 2000, and conductor rail 2001.

DETAILED DESCRIPTION

The following describes embodiments of the present disclosure in detail. Examples of the embodiments are shown in the accompanying drawings, where the numerals that are the same or similar from beginning to end represent same or similar components or components that have same or similar functions. The embodiments described below with reference to the accompanying drawings are exemplary, and are used for explaining rather than limiting the present disclosure.

In the descriptions of this specification, descriptions such as reference terms "an embodiment", "some embodiments", "example", "specific example", or "some examples" intend to indicate that specific features, structures, materials, or characteristics described with reference to embodiments or examples are included in at least one embodiment or example of the present disclosure. In this specification, schematic descriptions of the foregoing terms do not need to direct at a same embodiment or example. Besides, the specific features, the structures, the materials or the characteristics that are described may be combined in a proper manner in any one or more embodiments or examples. In addition, in a case that is not mutually contradictory, persons skilled in the art can combine or group different embodiments or examples that are described in this specification and features of the different embodiments or examples.

In the description of the present disclosure, it is understandable that "front-rear direction" and "longitudinal" are the running directions of the straddle-type monorail vehicle, i.e., the extending direction of the rail girder 2000, "left-right direction" is perpendicular to the running direction of the straddle-type monorail vehicle, "left-right direction" is the "transverse direction" of the straddle-type monorail vehicle, and "up-down direction" is the up-down direction in the conventional concept, "inside" refers to a position close to the rail girder 2000, and "outside" refers to a position far away from the rail girder 2000.

The present disclosure is described in detail below with reference to the accompanying drawings and the embodiments.

A bogie assembly 1000 according to one embodiment of the present disclosure will be described in detail with reference to the drawings. As illustrated in FIGS. 1 to 12, the bogie assembly 1000 comprises a bogie frame 100, a traction mechanism 200, a running wheel 300, guide wheels 400, stabilizing wheels 500, an electric assembly 600 and a suspension system 700.

The bogie frame 100 is provided with a rail concave portion for straddling the rail girder 2000. The traction mechanism 200, the running wheel 300, the guide wheels 400, the stabilizing wheels 500, the electric assembly 600 and the suspension system 700 are all mounted on the bogie frame 100. The suspension system 700 supports between the bogie frame 100 and the vehicle body of the straddle-type monorail vehicle. The electric assembly 600 is used to drive the running wheel 300 to move along the walking surface of the rail girder 2000. The traction mechanism 200 is connected between the bogie frame 100 and the vehicle body of the straddle-type monorail vehicle. The traction mechanism 200 is used to transfer the force of the running wheel 300 to the vehicle body. The guide wheels 400 and the stabilizing wheels 500 clamp on the sidewalls of the rail girder 2000.

The running wheel 300, the guide wheels 400 and the stabilizing wheels 500 according to the embodiment of the present disclosure will be described below with reference to the drawings.

Figure 12:
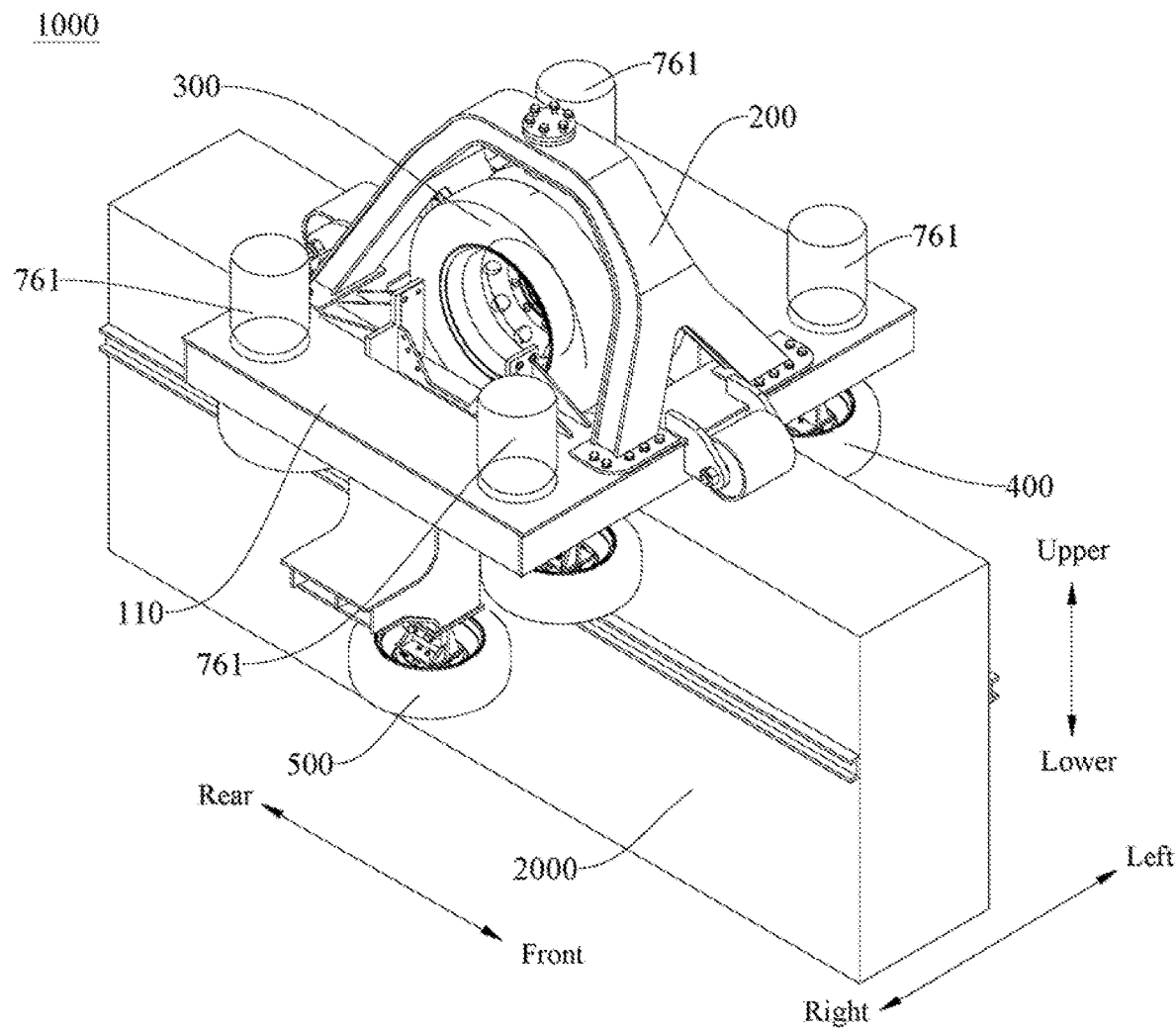
FIG. 12 is a structural schematic diagram of a bogie assembly and a rail girder according to another embodiment of the present disclosure.

As illustrated in FIG. 1 and FIG. 12, the running wheel 300 runs along the walking surface (upper surface) of the rail girder 2000. The number of the running wheel 300 is at least one, and the rotating axis of the running wheel 300 is in parallel with the walking surface of the rail girder 2000. In some embodiments of the present disclosure, the running wheel 300 may comprise a rubber tire, such that the shock-proof performance of the straddle-type monorail vehicle is better. Of course, the running wheel 300 may also be a steel wheel.

Figure 11:
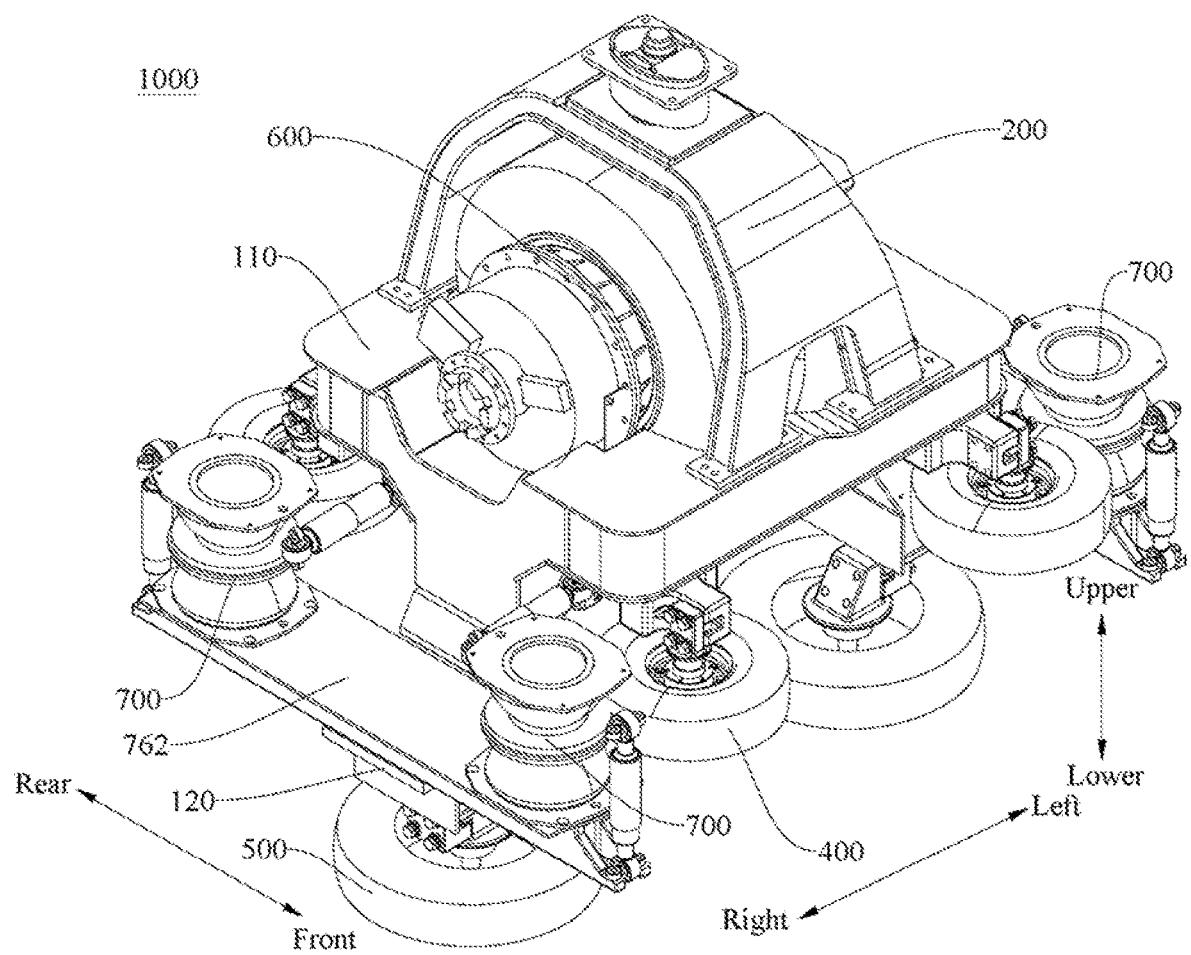
FIG. 11 is a structural schematic diagram of a bogie assembly according to one embodiment of the present disclosure.

As illustrated in FIG. 1, FIG. 11 and FIG. 12, the bogie assembly 1000 may be provided with two pairs of guide wheels 400, and the two pairs of guide wheels 400 are spaced apart along the front-rear direction. Each pair of guide wheels 400 comprises two guide wheels 400, the two guide wheels 400 are symmetrically arranged with respect to the rail girder 2000, and the two guide wheels 400 are respectively in contact with one sidewall of the rail girder 2000. The distance from the rotating axes of the two guide wheels 400 of the same pair of guide wheels 400 to the rotating axis of the running wheel 300 are equal.

The number of the stabilizing wheels 500 is at least two. The two stabilizing wheels 500 are symmetrically arranged with respect to the rail girder 2000. The two stabilizing wheels 500 are respectively in contact with one sidewall of the rail girder 2000. The rotating axis of each stabilizing wheel 500 is perpendicular to the rotating axis of the running wheel 300.

The traction mechanism 200 according to the embodiment of the present disclosure will be described below with reference to FIGS. 2 to 6. As illustrated in FIGS. 2 to 6, the traction mechanism 200 comprises a traction frame 210 and a traction pin assembly 220. The traction frame 210 is connected with the frame body 110 of the bogie frame 100, the traction pin assembly 220 is connected with the traction frame 210, and the traction pin assembly 220 is adapted to be connected with the vehicle body. The traction force is transmitted successively through the bogie frame 100, the traction frame 210, the traction pin assembly 220 and the vehicle body.

Figure 2:
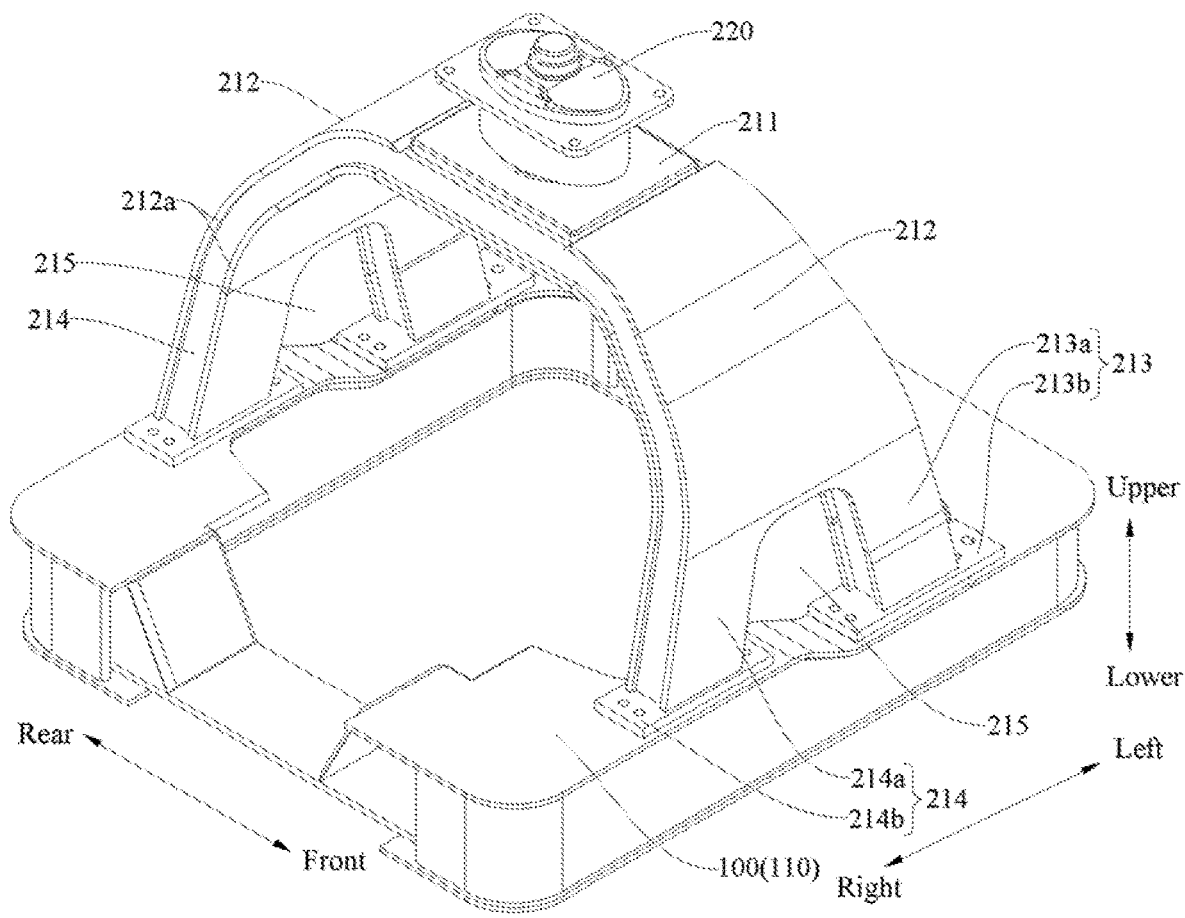
FIG. 2 is a structural schematic diagram of a bogie assembly and a traction mechanism according to one embodiment of the present disclosure.

The traction frame 210 according to the embodiment of the present disclosure will be described with reference to FIG. 2. As illustrated in FIG. 2, the traction frame 210 comprises a top wall 211, sidewalls 212 and fixing seats.

Herein, two sidewalls 212 are provided. The upper ends of the two sidewalls 212 are respectively connected with the front end of the top wall 211 and the rear end of the top wall 211. The lower end of each sidewall 212 is provided with a plurality of fixing seats, and the fixing seats are used for being connected with the frame body 110. The plurality of fixing seats connected below the two sidewalls 212 is respectively connected with the front arm and rear arm of the frame body 110. The plurality of fixing seats below one sidewall 212 is connected with the front arm of the frame body 110, and the plurality of fixing seats below the other sidewall 212 is connected with the rear arm of the frame body 110, such that the traction frame 210 is adapted for straddling the bogie frame 100 along the front-rear direction. Thus, the rigidity of the traction frame 210 in the front-rear direction is greater than that in the left-right direction, and it helps the traction frame 210 to transfer the traction force in the front-rear direction.

Referring to FIG. 2, the plurality of fixing seats at the lower end of the same sidewall 212 comprises a first fixing seat 213 and a second fixing seat 214, and the first fixing seat 213 and the second fixing seat 214 are disposed at an interval along the left-right direction. The heights of the left half segment and right half segment of each of the front arm and rear arm of the frame body 110 are different, and the left half segment and the right half segment are connected by an arc-shaped segment, such that the strength of the bogie frame 100 is stronger. In addition, the bottom surface of the first fixing seat 213 and the bottom surface of the second fixing seat 214 are located on different horizontal planes to fit the frame body 110 of the bogie frame 100. As a result, the mounting strength of the traction frame 210 is strong, the traction frame 210 fits the bogie frame 100 better and transfers the traction force better.

In the traction frame 210 according to the embodiment of the present disclosure, by providing a plurality of fixing seats at different heights, it helps the traction frame 210 to fit with the bogie frame 100, and the strength of the traction frame 210 is high. Therefore, it can bear larger traction force, and the traction process is stable and reliable.

The sidewalls 212 and the top wall 211 of the traction frame 210 may be jointly formed as an arch-shaped structure. The traction frame 210 is adapted to cover a position above the running wheel 300, the top wall 211 may be flat, the top wall 211 is adapted to be connected with the vehicle body, and the sidewalls 212 may be arc-shaped. In the embodiment illustrated in FIG. 2, the sidewall 212 comprises a plurality of sequentially connected arc-shaped segments, and the width of the sidewall 212 is gradually increased from top to bottom, such that the strength of the traction frame 210 is stronger and the traction stability is better.

The edges of the left and right sides of the sidewall 212 may be provided with reinforcing ribs 212a to enhance the strength of the sidewall 212. Taking the right side of the sidewall 212 as an example, the front edge and the rear edge of the right side of the sidewall 212 respectively extend transversely outwards (i.e., towards the right) to form the reinforcing ribs 212a, and the formation method of the reinforcing ribs 212a of the edges of the left side of the sidewall 212 is the same as that of the right side.

Referring to FIG. 2, a position between the first fixing seat 213 and the corresponding second fixing seat 214 may be hollowed out to form a lightening hole 215. Thus, on the premise that the transfer of the traction force is not affected, the weight of the traction frame 210 can be reduced, and the lightweight level of the traction frame 210 can be improved.

There may be an arc-shaped transition angle between the sidewall of the lightening hole 215 and the top wall of the lightening hole 215 to prevent stress concentration formed at the junction between the sidewall of the lightening hole 215 and the top wall of the lightening hole 215, such that the durability of the traction frame 210 is higher.

The first fixing seat 213 may comprise a first connecting arm 213a and a first mounting plate 213b, the first connecting arm 213a is connected with the corresponding sidewall 212, and the first mounting plate 213b is connected with the first connecting arm 213a. Referring to FIG. 2, the upper end of the first connecting arm 213a is connected with the corresponding sidewall 212, and the lower end of the first connecting arm 213a is connected with the corresponding first mounting plate 213b. In some embodiments of the present disclosure, the first connecting arm 213a can be connected with the first mounting plate 213b through welding. In addition, the first mounting plate 213b is adapted to be connected with the bogie frame 100. For example, the first mounting plate 213b may be provided with a plurality of mounting holes, and threaded fastening members penetrate through the mounting holes and are connected with the frame body 110 of the bogie frame 100, such that the first mounting plate 213b is connected to the bogie frame 100.

The second fixing seat 214 may comprise a second connecting arm 214a and a second mounting plate 214b, the second connecting arm 214a is connected with the corresponding sidewall 212, and the second mounting plate 214b is connected with the second connecting arm 214a. Referring to FIG. 2, the upper end of the second connecting arm 214a is connected with the corresponding sidewall 212, and the lower end of the second connecting arm 214a is connected with the corresponding second mounting plate 214b. In some embodiments of the present disclosure, the second connecting arm 214a may be connected with the second mounting plate 214b through welding. In addition, the second mounting plate 214b is adapted to be connected with the bogie frame 100. For example, the second mounting plate 214b may be provided with a plurality of mounting holes, and threaded fastening members penetrate through the mounting holes and are connected with the frame body 110 of the bogie frame 100, such that the second mounting plate 214b is connected to the bogie frame 100.

In some embodiments of the present disclosure, the first connecting arm 213a and the second connecting arm 214a are integrally molded with the corresponding sidewalls 212 respectively, such that the first connecting arm 213a is integrally molded with the corresponding sidewall 212, and the second connecting arm 214a is also integrally molded with the corresponding sidewall 212. In addition, the reinforcing rib 212a may extend from the edge of the sidewall 212 to the edge of the outer side of the first connecting arm 213a (i.e. the edge of the left side), the edge of the outer side of the second connecting arm 214a (i.e. the edge of the right side) and the edge of the lower side of the top wall 211.

The embodiment of the present disclosure further discloses a bogie assembly 1000. The bogie assembly 1000 according to the embodiment of the present disclosure is provided with the traction frame 210 described in any one of the above-mentioned embodiments, and the traction frame 210 is connected with the bogie frame 100. The traction force of the bogie assembly 1000 according to the embodiment of the present disclosure is transferred stably, and it can bear a larger driving force.

The embodiment of the present disclosure further discloses a straddle-type monorail vehicle. The straddle-type monorail vehicle according to the embodiment of the present disclosure is provided with the bogie assembly 1000 described in any one of the above-mentioned embodiments, and the traction frame 210 of the bogie assembly 1000 is connected with the vehicle body of the straddle-type monorail vehicle. The straddle-type monorail vehicle according to the embodiment of the present disclosure can transfer traction force stably.

The traction pin assembly 220 according to the embodiment of the present disclosure will be described below with reference to FIGS. 2 to 6.

Figure 3:
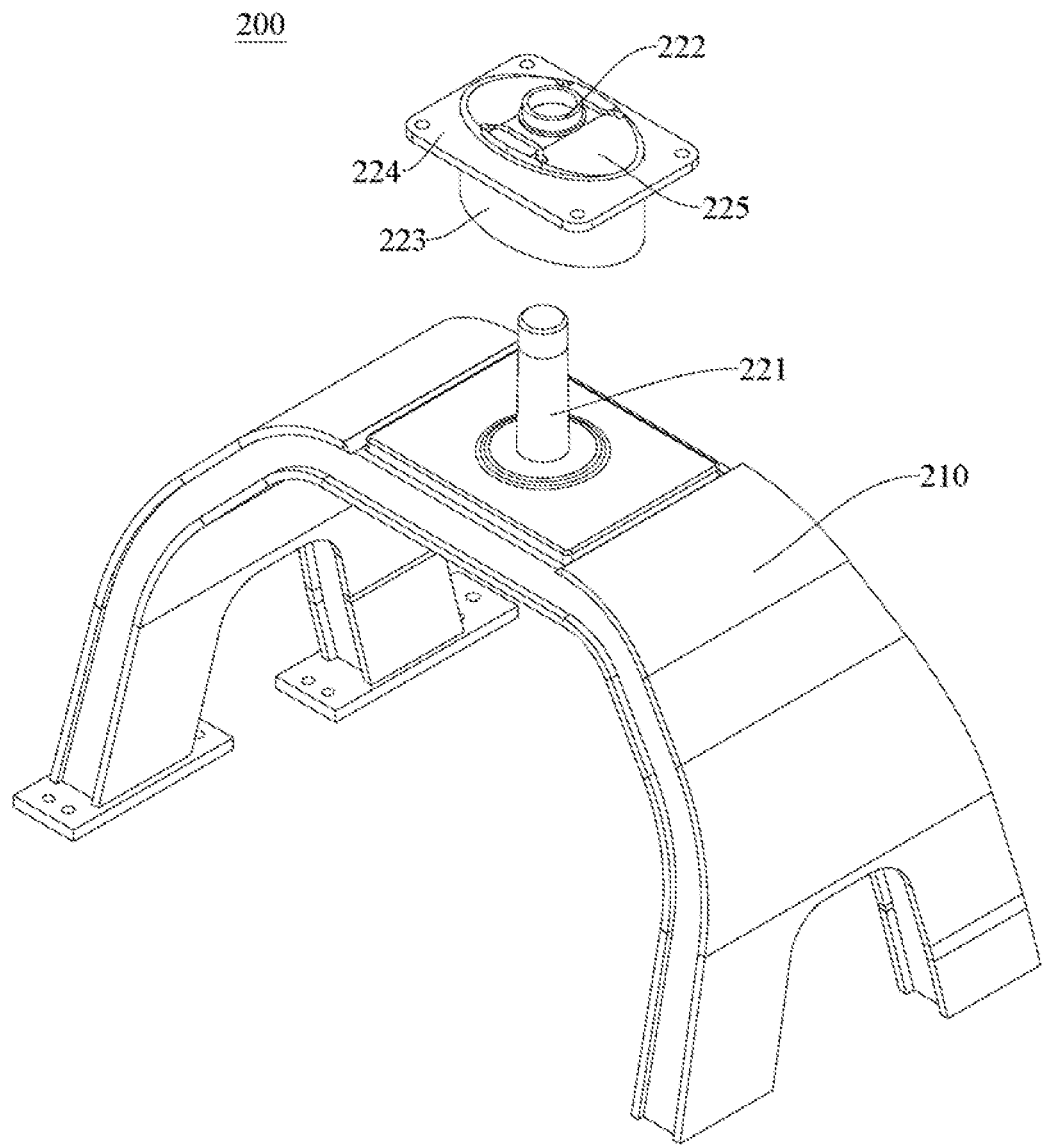
FIG. 3 is a structural schematic diagram of a traction mechanism according to one embodiment of the present disclosure.
Figure 4:
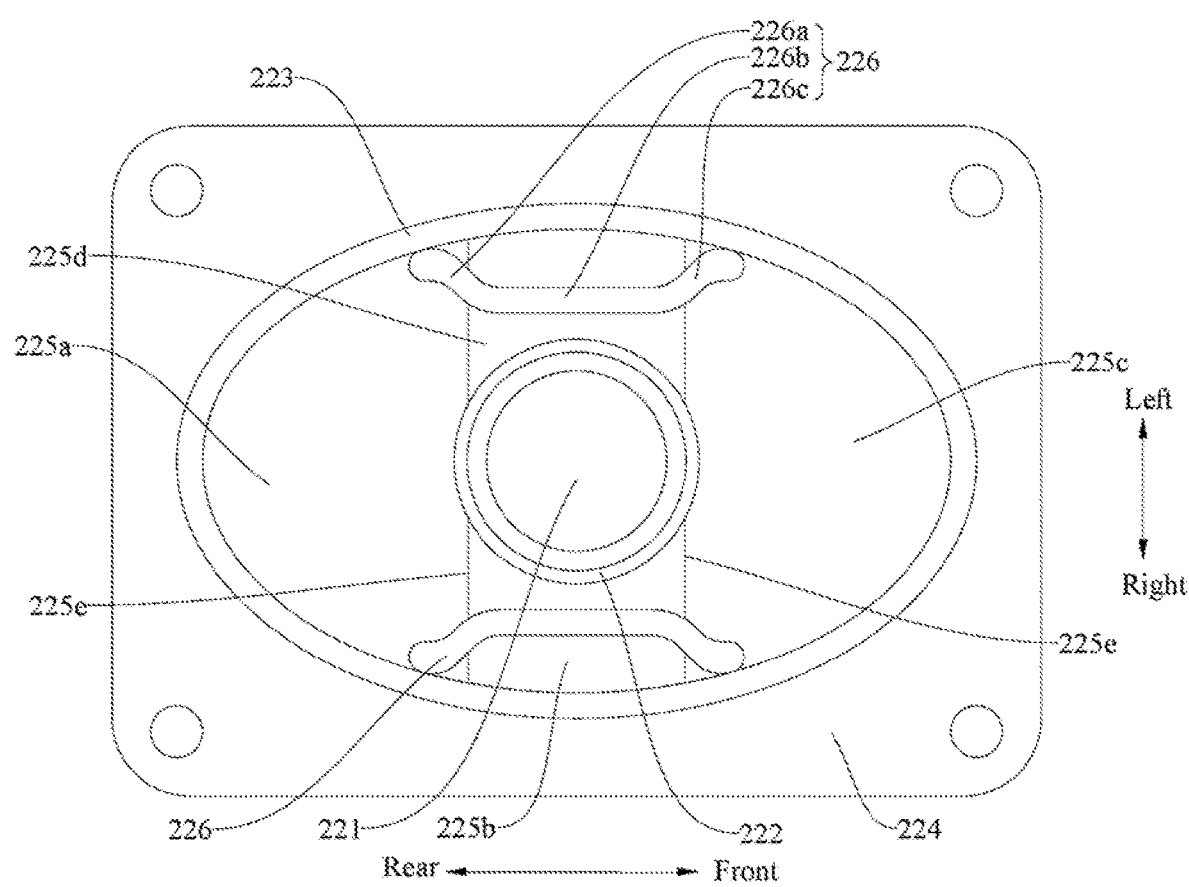
FIG. 4 is a top view of a traction pin assembly according to one embodiment of the present disclosure.

As illustrated in FIGS. 2 to 4, in some embodiments of the present disclosure, the traction pin assembly 220 comprises a pin shaft 221 and a vehicle body connecting member, the pin shaft 221 is connected with the traction frame 210 and the vehicle body connecting member. The vehicle body connecting member is adapted to be connected with the vehicle body, and the vehicle body connecting member is configured such that the rigidity in the front-rear direction is greater than the rigidity in the left-right direction.

It can be understood that, in the operating process of the traction mechanism 200, the traction force is mainly transferred along the front-rear direction, and the traction force is transferred from the traction frame 210 to the vehicle body through the pin shaft 221 and the vehicle body connecting member. By configuring the vehicle body connecting member such that the rigidity in the front-rear direction is greater than the rigidity in the left-right direction, the vehicle body connecting member can be prevented from being damaged, the traction is more stable and the stress concentration can be avoided during steering.

Referring to FIGS. 3 and 4, the vehicle body connecting member may comprise a pin bushing mounting seat and a pin bushing 222. The pin bushing 222 is connected with the pin bushing mounting seat, and the pin bushing mounting seat is adapted to be connected with the vehicle body. The pin bushing mounting seat may comprise a fixing cylinder 223 and a mounting plate 224, the mounting plate 224 is connected with the fixing cylinder 223, the fixing cylinder 223 may be sleeved over the pin bushing 222, and a buffer member 225 is arranged between the fixing cylinder 223 and the pin bushing 222. One end of the pin shaft 221 is fixed onto the top wall 211 of the traction frame 210. For example, the pin shaft 221 may be connected with the top wall 211 of the traction frame 210 through welding, the pin bushing 222 is sleeved over the pin shaft 221, and the pin bushing 222 may be in interference fit with the pin shaft 221, such that the pin bushing 222 and the pin shaft 221 are not easily worn and do not produce abnormal noise.

The mounting plate 224 is adapted to be connected with the vehicle body. For example, the mounting plate 224 may be connected with the vehicle body through threaded fastening members. The mounting plate 224 may surround the fixing cylinder 223 along the circumferential wall of the fixing cylinder 223, that is, the fixing cylinder 223 may penetrate through the mounting plate 224, and the height of the portion above the mounting plate 224 of the fixing cylinder 223 is smaller than that of the portion below the mounting plate 224. When the vehicle body connecting member is connected with the vehicle body, the portion above the mounting plate 224 of the fixing cylinder 223 may fit with the concave portion on the vehicle body to position between the mounting plate 224 and the vehicle body.

When the traction mechanism 200 operates, the traction force is sequentially transmitted between the traction frame 210, the pin shaft 221, the pin bushing 222, the buffer member 225, the fixing cylinder 223 and the mounting plate 224, and then is transferred to the vehicle body to tract the vehicle body. The noise during traction force transfer is low, the traction is stable, and it can bear a larger traction force.

In the embodiment illustrated in FIG. 4, the fixing cylinder 223 may have an elliptical horizontal section, the long axis of the elliptical horizontal section is oriented along the front-rear direction, and the short axis of the elliptical horizontal section is oriented along the left-right direction. The buffer member 225 has an elliptical horizontal section, the long axis of the elliptical horizontal section is oriented along the front-rear direction, and the short axis of the elliptical horizontal section is oriented along the left-right direction. In this way, the rigidity of the vehicle body connecting member in the front-rear direction can be configured to be greater than that in the left-right direction, moreover the buffer member 225 can absorb more shock in the front-rear direction, and thus the shock-proof performance of the traction mechanism 200 is better.

In some embodiments of the present disclosure, the buffer member 225 can have a gap 226, and the gap 226 may be located on the left side or right side of the pin bushing 222. As illustrated in FIG. 4, the number of the gaps 226 may be two, the two gaps 226 may be respectively located on the left side and right side of the pin bushing 222. The two gaps 226 may be symmetrically arranged with respect to a symmetry plane, the normal of the symmetry plane is oriented along the left-right direction, and the central axis of the pin bushing 222 is in the symmetry plane.

It can be understood that, in the operating process of the traction mechanism 200, the traction force is mainly transferred along the front-rear direction, and the shock impact is mainly from the front-rear direction. By configuring the gaps 226 on the left side and right side of the pin bushing 222, the mass of the traction mechanism 200 can be reduced, the rigidity of the vehicle body connecting member in the left-right direction can be reduced, and the connection strength of the vehicle body connecting member in the left-right direction can be increased.

Referring to FIG. 4, the horizontal section of the gap 226 may be arch-shaped. The gap 226 comprises a first segment 226a, a second segment 226b and a third segment 226c sequentially connected along the front-back direction. The second segment 226b is rectangular, and the long side of the rectangular second segment 226b faces the pin bushing 222. The first segment 226a is an arc-shaped segment extending from the short side of the second segment 226b to the edge of the buffer member 225, and the first segment 226a and the third segment 226c are symmetrically arranged.

In some embodiments of the present disclosure, the buffer member 225 may include a plurality of sub-buffer members. As illustrated in FIG. 4, the buffer member 225 is divided into four sub-buffer members 225a, 225b, 225c and 225d by two parallel partitioning planes 225e and the pin bushing 222. The normal of the partitioning planes 225e is oriented along the front-rear direction, and the two partitioning planes 225e are intersected with the pin bushing 222.

The sub-buffer member 225a and the sub-buffer member 225c are symmetrically arranged, the sub-buffer member 225b and the sub-buffer member 225d are symmetrically arranged, and the sub-buffer member 225b and the sub-buffer member 225d are located between the two partitioning planes 225e.

The two gaps 226 respectively divide the sub-buffer member 225b and the sub-buffer member 225d into two portions, the portion, close to the pin bushing 222, in the two portions is fixed with the pin bushing 222, and the portion, close to the fixing cylinder 223, in the two portions is fixed with the fixing cylinder 223. For example, the buffer member 225 may be a rubber member, the pin bushing 222 and the fixing cylinder 223 may be metal members, and the buffer member 225 may be respectively vulcanized with the pin bushing 222 and the fixing cylinder 223. Thus, the two portions of the sub-buffer member 225b and the sub-buffer member 225d divided by the gaps 226 can be prevented from shaking along the left-right direction.

Figure 5:
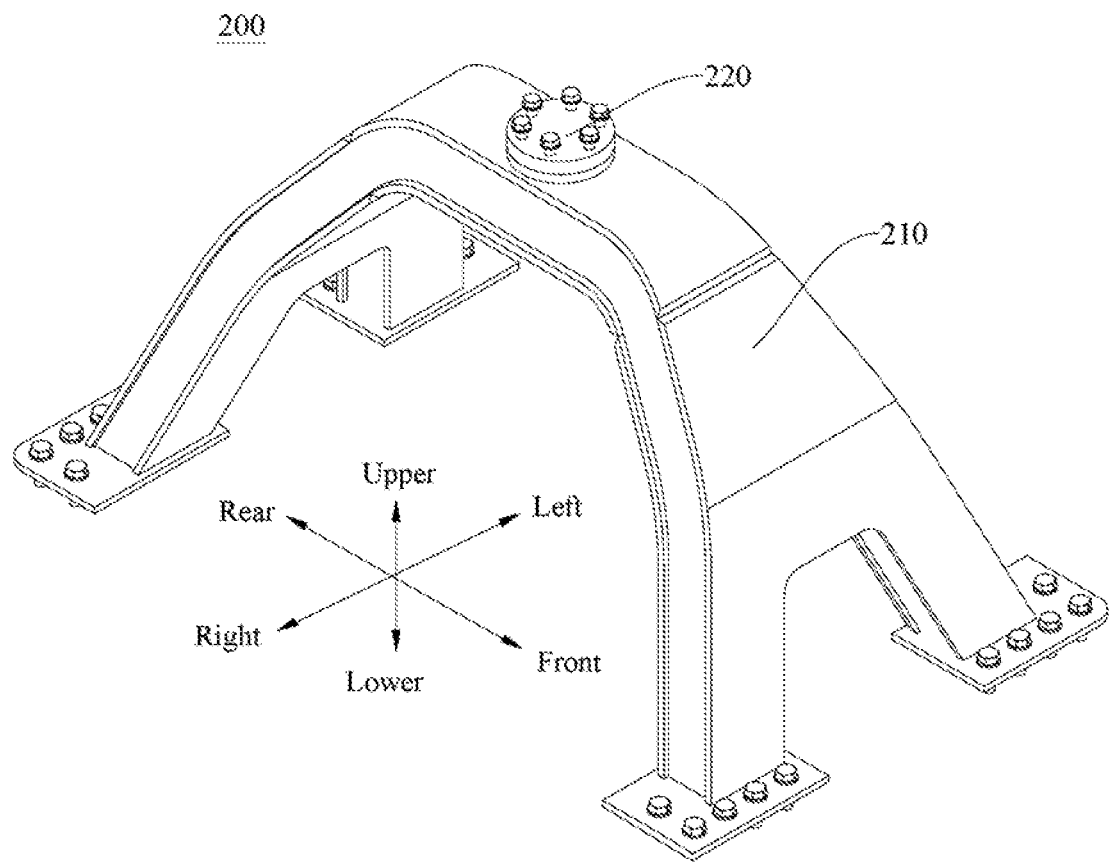
FIG. 5 is a structural schematic diagram of a traction mechanism according to another embodiment of the present disclosure.
Figure 6:
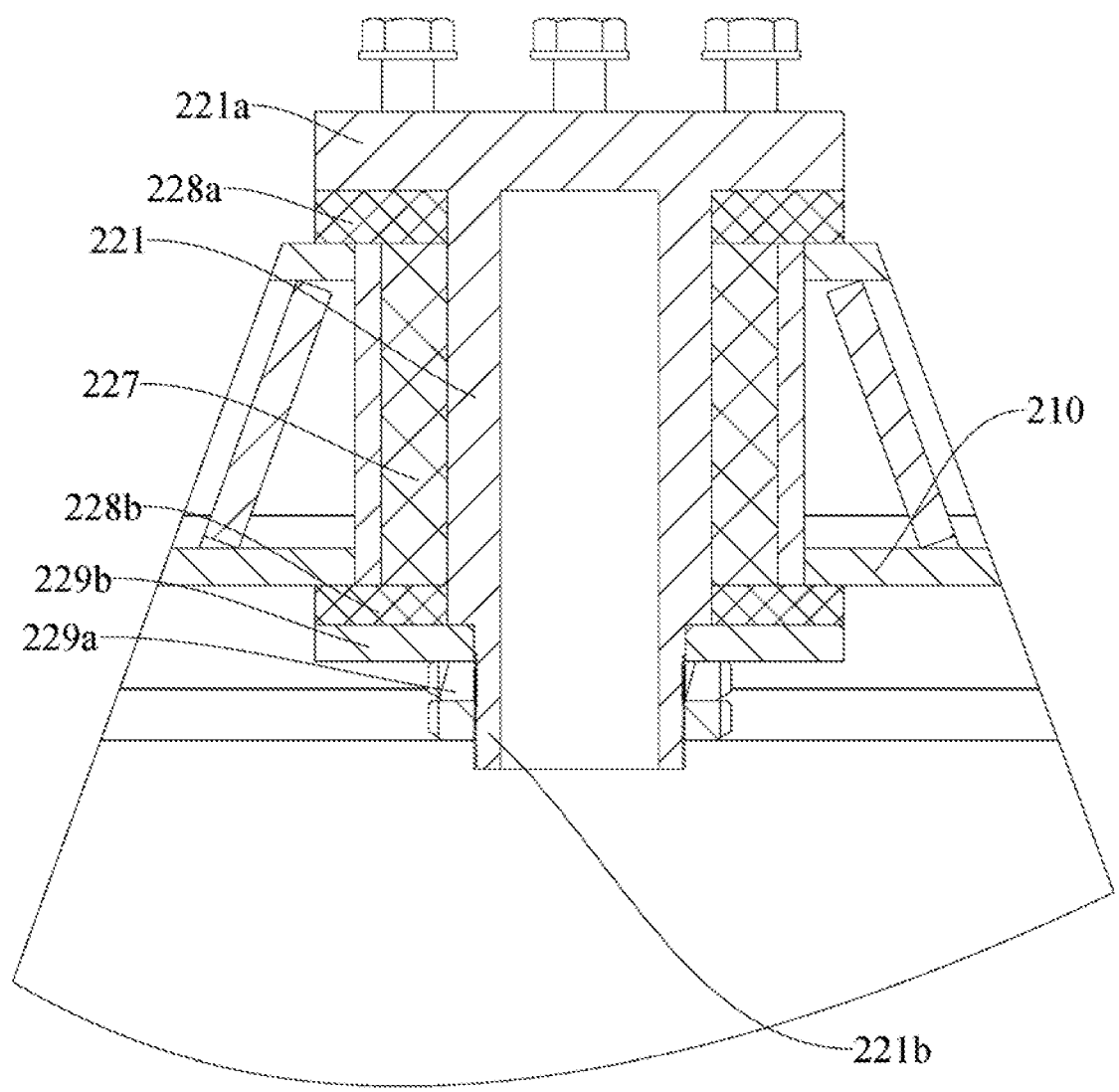
FIG. 6 is a sectional view of a traction pin assembly according to another embodiment of the present disclosure.

As illustrated in FIGS. 5 to 6, in other embodiments of the present disclosure, the traction pin assembly 220 may comprise a pin shaft 221, and the pin shaft 221 is connected to the top wall 211 of the traction frame 210. For example, the top wall 211 of the traction frame 210 may be provided with a mounting hole, the lower end of the pin shaft 221 may have a threaded segment 221b. The pin shaft 221 penetrates through the mounting hole, and the threaded segment 221b is fixed through a nut 229a. The nut 229a may be located below the top wall 211 of the traction frame 210, and a gasket 229b may be clamped between the nut 229a and the top wall 211 of the traction frame 210. The upper end of the pin shaft 221 may be provided with a flange 221a, and the flange 221a is adapted to be connected with the vehicle body through threaded fastening members.

In some embodiments of the present disclosure, the traction pin assembly 220 may further comprise an upper shock absorbing pad 228a and a lower shock absorbing pad 228b, the upper shock absorbing pad 228a may be clamped between the flange 221a and the upper surface of the top wall 211 of the traction frame 210, and the lower shock absorbing pad 228b may be clamped between the nut 229a and the lower surface of the top wall 211. Specifically, the lower shock absorbing pad 228b may be clamped between the lower surface of the top wall 211 and the gasket 229b. In some embodiments of the present disclosure, both the upper shock absorbing pad 228a and the lower shock absorbing pad 228b may be rubber members.

The traction pin assembly 220 may further comprise a bushing 227, the bushing 227 is sleeved over the pin shaft 221, and the length of the bushing 227 may be the same as the thickness of the top wall 211 of the traction frame 210. The bushing 227 may comprise a plurality of layers, such as an outer steel bushing, an inner steel bushing and a buffer bushing. The buffer bushing is located between the outer steel bushing and the inner steel bushing, and the buffer bushing may be a rubber member. The outer steel bushing may be in interference fit with the mounting hole in the top wall 211 of the traction frame 210, the inner steel bushing is sleeved over the pin shaft 221, and the inner steel bushing may be in interference fit with the pin shaft 221.

The traction mechanism 200 according to the embodiment of the present disclosure comprises the traction frame 210 according to any one of the above-mentioned embodiments and the traction pin assembly 220 according to any one of the above-mentioned embodiments, such that the strength of the traction mechanism 200 is high, it can bear a larger traction force, the traction process is stable and reliable, and the noise is low.

The embodiment of the present disclosure further discloses a bogie assembly 1000. The bogie assembly 1000 according to the embodiment of the present disclosure is provided with the traction mechanism 200 described in any one of the above-mentioned embodiments, and the traction mechanism 200 is connected with the bogie frame 100 of the bogie assembly 1000. The traction force of the bogie assembly 1000 according to the embodiment of the present disclosure is transferred stably and it can bear a larger driving force.

The embodiment of the present disclosure further discloses a straddle-type monorail vehicle. The straddle-type monorail vehicle according to the embodiment of the disclosure is provided with a bogie assembly 1000 described in any one of the above-mentioned embodiments, and the traction mechanism 200 of the bogie assembly 1000 is connected with the vehicle body of the straddle-type monorail vehicle. The traction force of the straddle-type monorail vehicle according to the embodiment of the present disclosure is stably transferred.

The electric assembly 600 according to the embodiment of the present disclosure will be described below with reference to FIGS. 1 and 7 to 9.

Figure 7:
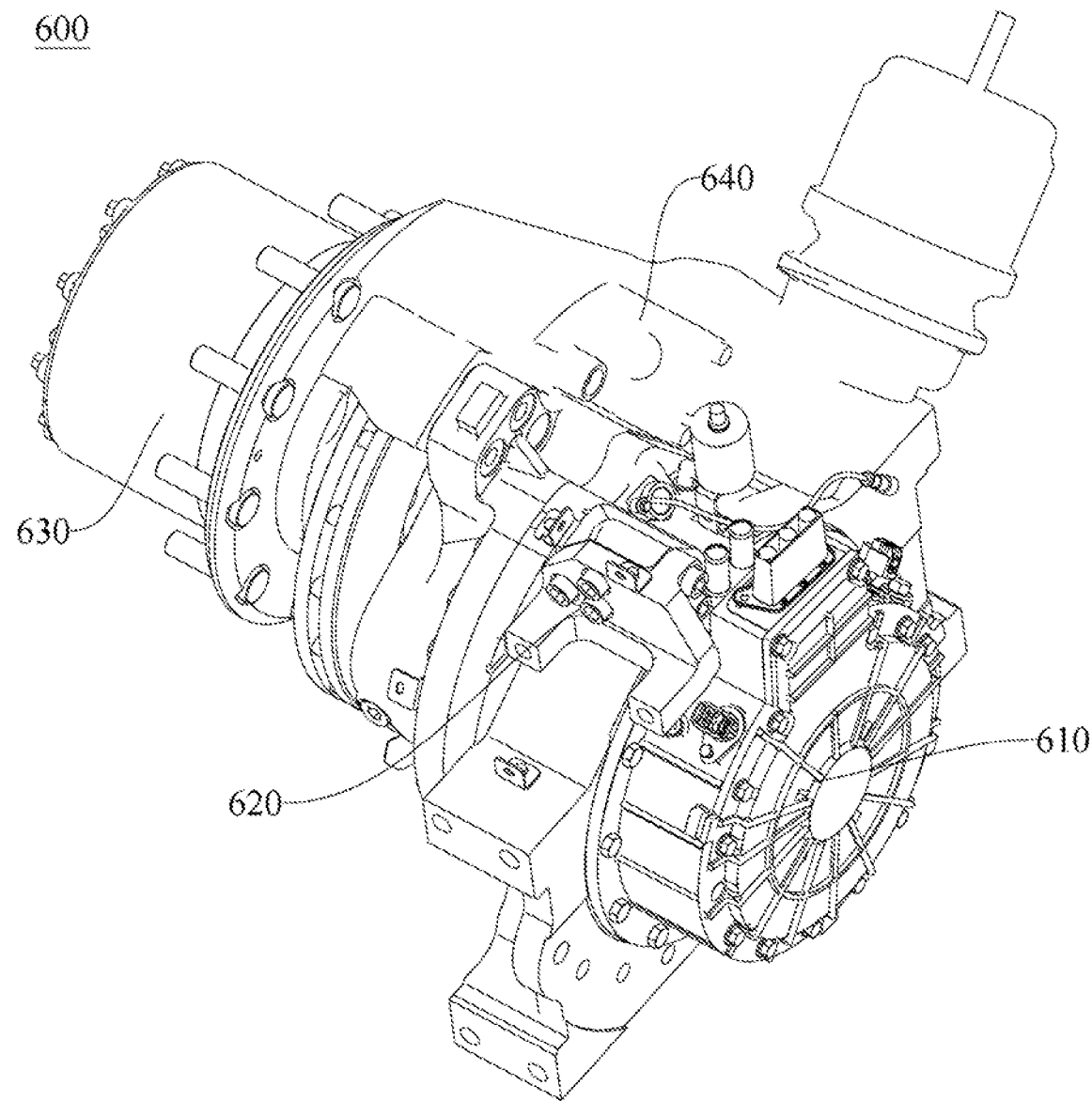
FIG. 7 is a structural schematic diagram of an electric assembly according to one embodiment of the present disclosure.
Figure 8:
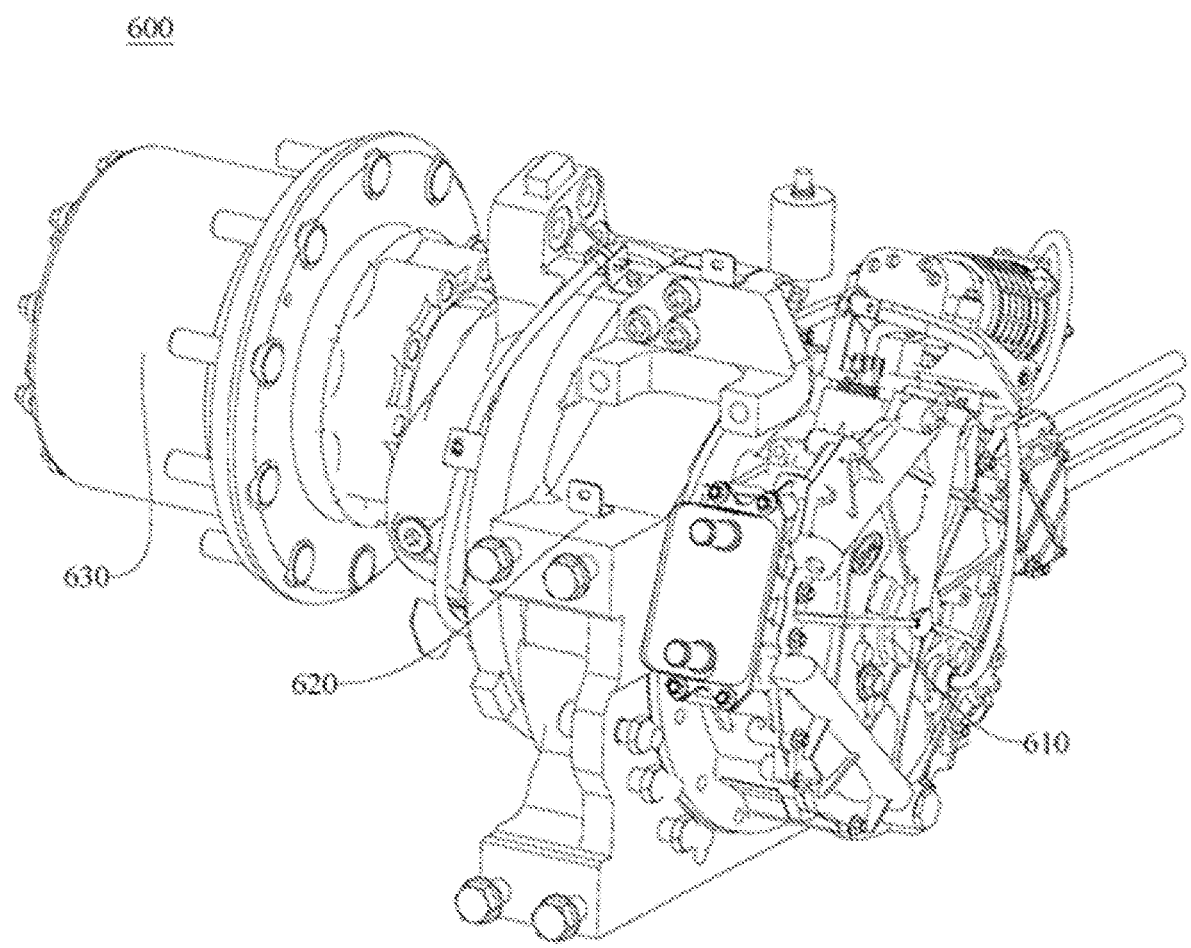
FIG. 8 is a structural schematic diagram of an electric assembly (without a brake) according to one embodiment of the present disclosure.

Referring to FIGS. 1 and 7, the electric assembly 600 is mounted on the bogie frame 100, and the electric assembly 600 comprises a traction motor 610, a gear reducer 620 and a planetary wheel-side reducer 630. The traction motor 610 is connected with the input shaft of the gear reducer 620, the output shaft of the gear reducer 620 is connected with the input end of the planetary wheel-side reducer 630, and the output end of the planetary wheel-side reducer 630 is connected with a hub of the running wheel 300. The electric assembly 600 may be powered from the conductive rail 2001 on the rail girder 2000.

Such that, the electric assembly 600 comprises at least two stages of reducing mechanisms, and the transmission ratio of the electric assembly 600 is large, thus the traction motor 610 with high rotating speed may be adopted in a certain range, the energy efficiency of the electric assembly 600 is high, and it is conducive to energy conservation and environmental protection.

Since the bogie assembly 1000 according to the embodiment of the present disclosure adopts a driving solution of integrally mounting the traction motor 610, the gear reducer 620, the planetary wheel-side reducer 630, the hub and the like, the overall structure is simple, the occupied space is small, a low floor structure can be implemented, the weight is light, the energy efficiency is high and it is conducive to energy conservation and environmental protection.

In some embodiments of the present disclosure, the electric assembly 600 may be disposed on the inner side of the bogie frame 100, and the traction motor 610 may be transversely disposed, i.e., the axis of the motor shaft of the traction motor 610 may be oriented along the transverse direction (left-right direction). In this way, the structure of the bogie assembly 1000 is a compact structure, and the transverse and longitudinal sizes are smaller. The traction motor 610 may be connected with the box body of the gear reducer 620, and the box body of the gear reducer 620 may be connected with the bogie frame 100. For example, the bogie frame 100 may be provided with a motor mounting bracket, and the box body of the gear reducer 620 may be connected with the motor mounting bracket through threaded fastening members. The number of the motor mounting bracket may be two. The two motor mounting brackets are spaced apart along the front-rear direction to clamp the electric assembly 600. The motor mounting bracket may comprise a connecting plate and a supporting spoke plate, the connecting plate is connected with the box body of the gear reducer 620 through threads, the supporting spoke plate may be constructed to be triangular, one side of the supporting spoke plate is welded with the connecting plate, and the other side of the supporting spoke plate is welded with the bogie frame 100.

In some embodiments of the present disclosure, the electric assembly 600 may further comprise a brake 640, and the brake 640 may be disposed between the traction motor 610 and the running wheel 300. As illustrated in FIG. 7, the brake 640 is mounted between the gear reducer 620 and the hub of the running wheel 300. In this way, no separated position for mounting the brake 640 on the bogie frame 100 is needed, the weight of the bogie assembly 1000 can be reduced, the space utilization can be significantly improved, and a space is provided for the layout of other parts.

Figure 9:
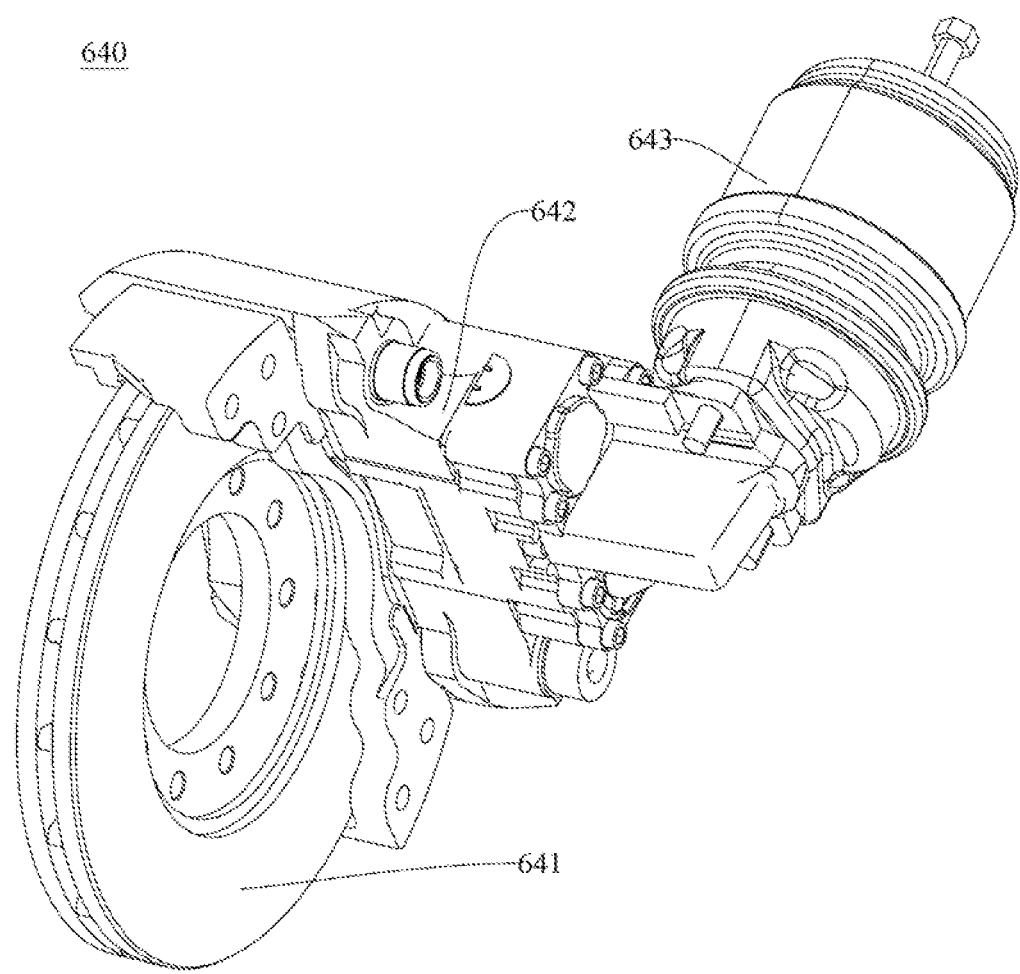
FIG. 9 is a structural schematic diagram of a brake according to one embodiment of the present disclosure.

Referring to FIG. 9, the brake 640 comprises a brake disc 641, brake calipers 642 and a brake driving unit 643, wherein the brake disc 641 may be connected with the hub of the running wheel 300. For example, the brake disc 641 may be connected with the hub of the running wheel 300 through threaded connecting members, the brake calipers 642 may be connected with the box body of the gear reducer 620, and the brake driving unit 643 is used to drive the brake calipers 642. In some embodiments of the present disclosure, the brake driving unit 643 may be a cylinder. Of course, the brake 640 may also adopt a hydraulic brake driving unit 643 or a pneumatic-hydraulic brake driving unit 643.

The embodiment of the present disclosure further discloses a bogie assembly 1000, and the bogie assembly 1000 according to the embodiment of the present disclosure comprises a bogie frame 100, a running wheel 300 and an electric assembly 600 described in any one of the above-mentioned embodiments. The bogie assembly 1000 according to the embodiments of the present disclosure has the advantages that the overall structure is simple, the occupied space is small, the weight is light, the energy efficiency is high, and it is conducive to energy conservation and environmental protection.

The embodiment of the present disclosure further discloses a straddle-type monorail vehicle, and the straddle-type monorail vehicle according to the embodiment of the present disclosure comprises the bogie assembly 1000 described in any one of the above-mentioned embodiments. The straddle-type monorail vehicle according to the embodiments of the present disclosure has the advantages that the structure is simple, the weight is light, the energy efficiency is high, and it is conducive to energy conservation and environmental protection.

The suspension system 700 according to the embodiments of the present disclosure will be described below with reference to FIGS. 1 and 10 to 12.

Figure 10:
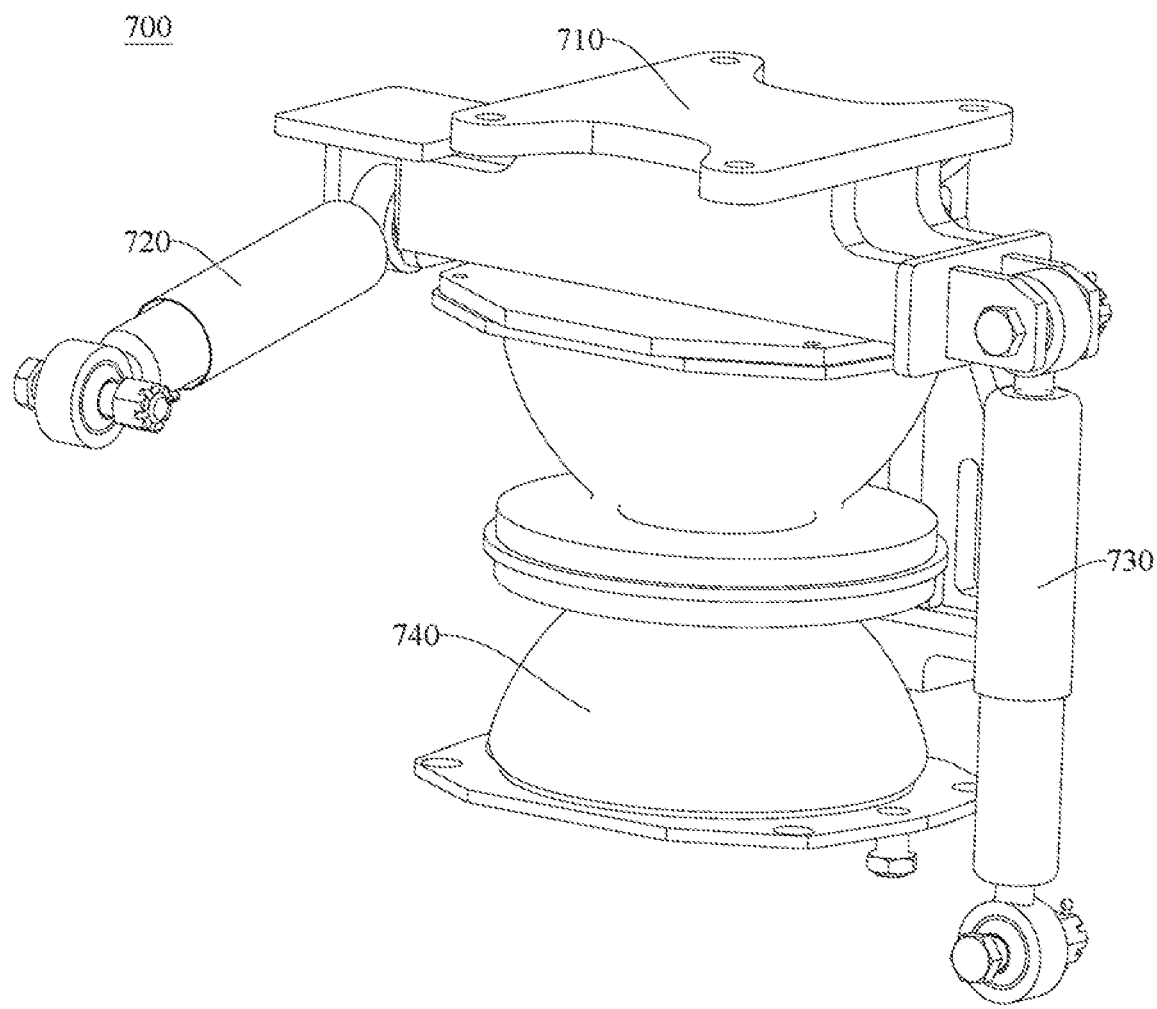
FIG. 10 is a structural schematic diagram of a suspension system according to one embodiment of the present disclosure.

The suspension system 700 supports between the bogie frame 100 and the vehicle body. As illustrated in FIG. 10, the suspension system 700 comprises an elastic member 740 and a shock absorber assembly, and the shock absorber assembly comprises a suspension mounting seat 710, a transverse shock absorber 720 and a longitudinal shock absorber 730. The suspension mounting seat 710 is adapted to be connected with the vehicle body, the transverse shock absorber 720 is connected between the suspension mounting seat 710 and the bogie frame 100, the longitudinal shock absorber 730 is connected between the suspension mounting seat 710 and the bogie frame 100, and the elastic member 740 is connected between the suspension mounting seat 710 and the bogie frame 100. In some embodiments of the present disclosure, the elastic member 740 is an hourglass spring, as illustrated in FIGS. 1 and 11.

Thus, the elastic member 740, the transverse shock absorber 720 and the longitudinal shock absorber 730 may jointly guarantee the stability of the straddle-type monorail vehicles in the up-down direction, the left-right direction, and the front-rear direction. Moreover, the suspension system 700 can absorb and buffer shock, thus the shocking or bumping feeling of the rail vehicle in the course of running can be reduced and the running noise of the straddle-type monorail vehicle can be reduced.

In some embodiments of the present disclosure, the suspension mounting seat 710 is located above the suspension supporting seat 120 of the bogie frame 100, the upper end of the elastic member 740 is connected to the suspension mounting seat 710, and the lower end of the elastic member 740 is connected to the suspension supporting seat 120. The transverse shock absorber 720 is hinged between the suspension mounting seat 710 and the frame body 110, and the longitudinal shock absorber 730 is hinged between the suspension mounting seat 710 and the suspension supporting seat 120.

Herein, the hinging between the transverse shock absorber 720 and the frame body 110, the hinging between the transverse shock absorber 720 and the suspension mounting seat 710, the hinging between the longitudinal shock absorber 730 and the suspension mounting seat 710, and the hinging between the longitudinal shock absorber 730 and the suspension supporting seat 120 are spherical hinging, which can improve the shock absorbing effect of the suspension system 700 and avoid stress concentration, thus further improves the reliability of the suspension system 700.

Referring to FIG. 10, in order to enable the suspension system 700 to be reasonably constructed and to enable the transverse shock absorber 720 and the longitudinal shock absorber 730 to work better, the transverse shock absorber 720 and the longitudinal shock absorber 730 may be respectively located on the both sides of the elastic member 740.

In some embodiments of the present disclosure, the number of the suspension systems 700 is an even number, such as two or four, and the suspension systems 700 are symmetrically disposed with respect to the center of the bogie frame 100, such that the vehicle body can be prevented from twisting in the horizontal plane and the stability of the rail vehicle during running can be improved.

In the embodiments illustrated in FIGS. 1 and 11, the elastic member 740 is an hourglass spring and is connected with the suspension supporting seat 120 of the bogie frame 100. Specifically, the bogie assembly 1000 further comprises supporting plates 762, the supporting plates 762 are mounted on the suspension supporting seat 120, and the elastic members 740 are mounted on the supporting plates 762. For example, the elastic member 740 may be connected with the supporting plate 762 through threaded fastening members. The supporting plate 762 may extend along the front-rear direction, and two elastic members 740 are mounted on each supporting plate 762. The bogie frame 100 is provided with two suspension supporting seats 120 spaced apart along the left-right direction, and each suspension supporting seat 120 is connected with the supporting plate 762. Such that, each bogie frame 100 may have four elastic members 740, the four elastic members 740 are respectively distributed on the two sides of the frame body 110 of the bogie frame 100, i.e., two elastic members 740 are distributed on one side of the frame body 110 of the bogie frame 100, and the other two elastic members 740 are distributed on the other side of the frame body 110 of the bogie frame 100. In other words, four suspension systems 700 are provided, and the four suspension systems 700 are symmetrically distributed on the two sides of the frame body 110 of the bogie frame 100 with respect to the center of the bogie frame 100.

Noticeably, that the suspension mounting seat 710 is not illustrated in the embodiments of FIGS. 1 and 11 in order to illustrate the connection and position relationship between the elastic members 740 and other components.

In other embodiments of the present disclosure, the elastic members 740 are air springs (i.e., the hourglass spring is replaced with the air spring, which is not shown in this embodiment), while the other components of the suspension system 700 remain unchanged, the bogie assembly 1000 according to the embodiments of the disclosure comprises a bogie frame 100, a traction mechanism 200 and a suspension system 700 with an air spring.

In these embodiments, the traction mechanism 200 is the traction mechanism 200 described in any one of the above-mentioned embodiments. The traction mechanism 200 comprises the traction frame 210, the traction frame 210 is arch-shaped, the traction frame 210 straddles the bogie frame 100 along the front-rear direction, and the traction frame 210 is adapted to be connected with the vehicle body. The suspension system 700 is mounted on the bogie frame 100, and the suspension system 700 is used to support the vehicle body.

Because the support height of the air spring is adjustable, it is convenient to adjust the relative position of the vehicle body and the bogie frame 100, such that the application scope of the bogie assembly 1000 according to the embodiments of the present disclosure is wider. In addition, the suspension system 700 with the air spring fits the traction mechanism 200 with the above-mentioned structure, such that the bogie assembly 1000 operates more stably and reliably.

In other embodiments of the present disclosure, as illustrated in FIG. 12, the suspension system 700 comprises an air spring 761, and thus the bogie assembly 1000 according to the embodiments of the present disclosure comprises a bogie frame 100, a traction mechanism 200 and a plurality of air springs 761.

In these embodiments, the traction mechanism 200 is the traction mechanism 200 described in any one of the above-mentioned embodiments, the traction mechanism 200 comprises the traction frame 210, the traction frame is arch-shaped, the traction frame 210 straddles the bogie frame 100 in the front-rear direction, and the traction frame 210 is adapted to be connected with the vehicle body. A plurality of air springs 761 is directly mounted on the frame body 110 of the bogie frame 100 to support the vehicle body. The number of the air springs 761 may be four, and the four air springs 761 are respectively distributed at four corners of the frame body 110, i.e., one air spring 761 is arranged at each corner of the frame body 110, and the centers of the four air springs 761 form four vertices of a rectangle. Therefore, the suspension system 700 uniformly supports the vehicle body and the vehicle body can be prevented from nodding.

The embodiment of the present disclosure further discloses a straddle-type monorail vehicle, and the straddle-type monorail vehicle comprises the bogie assembly 1000 described in any one of the above-mentioned embodiments. The straddle-type monorail vehicle according to the embodiment of the present disclosure has good shock-proof performance.

In addition, terms "first" and "second" are used only for description purposes, and shall not be understood as indicating or suggesting relative importance or implicitly indicating a quantity of indicated technical features. Therefore, features defined by "first" and "second" may explicitly or implicitly include at least one feature. In the description of the present disclosure, unless otherwise specifically limited, "multiple" means at least two, for example, two or three.

In the present disclosure, it should be noted that unless otherwise clearly specified and limited, the terms "mounted", "connected", "connection", and "fixed" should be understood in a broad sense. For example, a connection may be a fixed connection, a detachable connection, or an integral connection; may be a mechanical connection or an electrical connection; may be a direct connection or an indirect connection by means of an intermediate medium; or may be internal communication between two elements or interaction relationship between two elements, unless otherwise clearly limited. A person of ordinary skill in the art may understand specific meanings of the foregoing terms in the present disclosure according to a specific situation.

Although the embodiments of the present disclosure are shown and described above, it may be understood that the foregoing embodiments are examples, and cannot be understood as limitations to the present disclosure. A person of ordinary skill in the art may make changes, modifications, replacements, and variations to the foregoing embodiments without departing from the scope of the present disclosure.

What is claimed is:

1. A bogie assembly, comprising:
   a bogie frame;
   an electric assembly mounted on the bogie frame, the electric assembly comprising a traction motor, a gear reducer and a planetary wheel-side reducer, the traction motor being connected with an input shaft of the gear reducer, and an output shaft of the gear reducer being connected with an input end of the planetary wheel-side reducer;
   a traction frame straddling across the bogie frame along a front-rear direction and covering the electric assembly;
   a running wheel mounted on the bogie frame, and an output end of the planetary wheel-side reducer being connected with a hub of the running wheel; and
   a suspension system comprising
   a suspension mounting seat suitable to be connected with a vehicle body,
   a transverse shock absorber connected between the suspension mounting seat and the bogie frame,
   a longitudinal shock absorber connected between the suspension mounting seat and the bogie frame, and
   an elastic member connected between the suspension mounting seat and the bogie frame.

2. The bogie assembly according to claim 1, wherein the electric assembly comprises:
   a brake disposed between the traction motor and the running wheel or between the gear reducer and the hub of the running wheel.

3. The bogie assembly according to claim 2, wherein the brake comprises:
   a brake disc connected with the hub of the running wheel;
   brake calipers connected with a box body of the gear reducer; and
   a brake driving unit driving the brake calipers.

4. The bogie assembly according to claim 1, wherein
   the electric assembly is disposed on an inner side of the bogie frame, or
   the traction motor is transversely disposed.

5. The bogie assembly according to claim 4, wherein the traction motor is connected with a box body of the gear reducer, and the box body of the gear reducer is connected with the bogie frame.

6. The bogie assembly according to claim 1, wherein the traction frame is connected with a traction pin assembly, and the traction pin assembly is suitable to be connected with a vehicle body.

7. The bogie assembly according to claim 6, wherein the traction pin assembly comprises
 a pin shaft connected with a top wall of the traction frame, an upper end of the pin shaft having a flange, and the flange being suitable to be connected with the vehicle body.

8. The bogie assembly according to claim 7, wherein
 the top wall of the traction frame has a mounting hole,
 the pin shaft has a threaded segment, and
 the pin shaft penetrates through the mounting hole, and the threaded segment is fixed on the traction frame through a nut.

9. The bogie assembly according to claim 8, wherein the traction pin assembly comprises:
 a bushing sleeved over the pin shaft;
 an upper shock absorbing pad clamped between the flange and an upper surface of the top wall of the traction frame; and
 a lower shock absorbing pad clamped between the nut and a lower surface of the top wall of the traction frame.

10. The bogie assembly according to claim 9, wherein the bushing comprises an outer steel bushing, an inner steel bushing, and a buffer bushing between the outer steel bushing and the inner steel bushing.

11. The bogie assembly according to claim 6, wherein the traction pin assembly comprises:
 a pin shaft connected with a top wall of the traction frame; and
 a vehicle body connecting member having a rigidity in a front-rear direction and a rigidity in a left-right direction, such that the rigidity in the front-rear direction is greater than the rigidity in the left-right direction, wherein the vehicle body connecting member comprises:
 a pin bushing mounting seat suitable to be connected with the vehicle body; and
 a pin bushing connected with the pin bushing mounting seat and sleeved over the pin shaft.

12. The bogie assembly according to claim 11, wherein the pin bushing mounting seat comprises:
 a fixing cylinder sleeved over the pin bushing, and a buffer member arranged between the fixing cylinder and the pin bushing; and
 a mounting plate connected with the fixing cylinder and suitable to be connected with the vehicle body.

13. The bogie assembly according to claim 12, wherein the fixing cylinder and the buffer member have an elliptical horizontal section respectively, a long axis of the elliptical horizontal section is oriented along the front-rear direction, and a short axis of the elliptical horizontal section is oriented along the left-right direction.

14. The bogie assembly according to claim 12, wherein the buffer member has a gap, and the gap is located on a left side or a right side of the pin shaft.

15. The bogie assembly according to claim 14, wherein a horizontal section of the gap is arch-shaped and comprises a first segment, a second segment and a third segment sequentially connected along the front-rear direction, the second segment is rectangular and a long side of the second segment faces the pin bushing, the first segment is an arc-shaped segment extending from a short side of the second segment to an edge of the buffer member, and the first segment and the third segment are symmetrically arranged.

16. The bogie assembly according to claim 12, wherein the buffer member is partitioned into four sub-buffer members by two parallel partitioning planes and the pin bushing, a normal of each partitioning plane is oriented along the front-rear direction, and each partitioning plane is intersected with the pin bushing.

17. The bogie assembly according to claim 16, wherein the buffer member has a gap, the gap divides the sub-buffer members between the two partitioning planes into two portions, a first one of the two portions is adjacent to the pin bushing and fixed with the pin bushing, and a second one of the two portions is adjacent to the fixing cylinder and fixed with the fixing cylinder.

18. The bogie assembly according to claim 1, wherein the traction frame is arch-shaped, covers over the running wheel, and comprises:
 a top wall; and
 two sidewalls, upper ends of the two sidewalls being connected with a front end and a rear end of the top wall, respectively,
 a lower end of each sidewall having a plurality of fixing seats for being connected with the bogie frame, the plurality of fixing seats at the lower end of each sidewall comprising a first fixing seat and a second fixing seat, and a bottom surface of the first fixing seat and a bottom surface of the second fixing seat being located on different horizontal planes.

19. A straddle-type monorail vehicle, comprising a bogie assembly, wherein the bogie assembly comprises:
 a bogie frame;
 an electric assembly mounted on the bogie frame, the electric assembly comprising a traction motor, a gear reducer and a planetary wheel-side reducer, the traction motor being connected with an input shaft of the gear reducer, and an output shaft of the gear reducer being connected with an input end of the planetary wheel-side reducer;
 a traction frame straddling across the bogie frame along a front-rear direction and covering the electric assembly;
 a running wheel mounted on the bogie frame and an output end of the planetary wheel-side reducer being connected with a hub of the running wheel; and
 a suspension system comprising
 a suspension mounting seat suitable to be connected with a vehicle body,
 a transverse shock absorber connected between the suspension mounting seat and the bogie frame,
 a longitudinal shock absorber connected between the suspension mounting seat and the bogie frame, and
 an elastic member connected between the suspension mounting seat and the bogie frame.

\* \* \* \* \*